United States Patent
Daikokuya et al.

(10) Patent No.: US 8,914,577 B2
(45) Date of Patent: Dec. 16, 2014

(54) DISK ARRAY CONTROL APPARATUS

(75) Inventors: Hidejirou Daikokuya, Kawasaki (JP); Mikio Ito, Kawasaki (JP); Kazuhiko Ikeuchi, Kawasaki (JP); Chikashi Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 775 days.

(21) Appl. No.: 12/652,873

(22) Filed: Jan. 6, 2010

(65) Prior Publication Data

US 2010/0205372 A1    Aug. 12, 2010

(30) Foreign Application Priority Data

Feb. 12, 2009   (JP) .................... 2009-029263

(51) Int. Cl.
  G06F 12/00   (2006.01)
  G06F 11/20   (2006.01)
  G06F 3/06    (2006.01)

(52) U.S. Cl.
  CPC .......... *G06F 11/2094* (2013.01); *G06F 3/0632* (2013.01); *G06F 3/0607* (2013.01); *G06F 3/0689* (2013.01)
  USPC ........................................................ 711/114

(58) Field of Classification Search
  CPC ... G06F 3/0607; G06F 3/0632; G06F 3/0689; G06F 11/2094
  See application file for complete search history.

(56) References Cited

U.S. PATENT DOCUMENTS

| | | | |
|---|---|---|---|
| 5,915,081 A | 6/1999 | Yamamoto et al. | |
| 6,557,123 B1 * | 4/2003 | Wiencko et al. | 714/701 |
| 7,434,090 B2 * | 10/2008 | Hartung et al. | 714/6.2 |
| 7,502,955 B2 | 3/2009 | Ishikawa et al. | |
| 2003/0221057 A1 * | 11/2003 | Smith et al. | 711/114 |
| 2007/0168706 A1 * | 7/2007 | Humlicek | 714/6 |
| 2007/0174672 A1 | 7/2007 | Benhase et al. | |
| 2008/0126838 A1 * | 5/2008 | Sangapu et al. | 714/5 |
| 2009/0210620 A1 * | 8/2009 | Jibbe et al. | 711/114 |
| 2009/0228649 A1 * | 9/2009 | Porel et al. | 711/114 |

FOREIGN PATENT DOCUMENTS

| | | |
|---|---|---|
| JP | 7-98635 | 4/1995 |
| JP | 08-221217 | 8/1996 |
| JP | 09-330182 | 12/1997 |
| JP | 2002-215337 | 8/2002 |
| JP | 2004-213441 | 7/2004 |
| JP | 2005-099995 | 4/2005 |
| JP | 2007-87039 | 4/2007 |
| JP | 2007-200299 | 8/2007 |

OTHER PUBLICATIONS

Japanese Office Action for corresponding Japanese Application 2009-029263; issued Nov. 30, 2010.

* cited by examiner

*Primary Examiner* — Matthew Bradley
*Assistant Examiner* — Ramon A Mercado
(74) *Attorney, Agent, or Firm* — Staas & Halsey LLP (57) ABSTRACT

A disk array control apparatus controls a disk array having a redundant configuration with two or more disk devices and a spare disk provided for lack of redundancy in the disk array. And the disk array control apparatus includes a failure detecting unit for detecting the lack of redundancy in the disk array, and a rebuilding control unit for performing rebuilding processing on a dedicated spare disk device assigned to the disk array with the lack of redundancy, the dedicated spare disk being the spare disk dedicatedly assigned to the two or more disk arrays including the disk devices having a same characteristic as that of the spare disk.

4 Claims, 9 Drawing Sheets

| RAID GROUP NUMBER |
| --- |
| STATUS |
| RAID LEVEL |
| NUMBER OF DISKS/DISK NUMBER |
| STRIPE SIZE/STRIPE DEPTH |
| BLOCK COUNT |
| NUMBER OF VOLUMES/VOLUME NUMBER |
| AVAILABILITY OF GLOBAL HOT SPARE |

| DISK NUMBER |
| --- |
| STATUS |
| RAID GROUP NUMBER |
| DISK TYPE |
| MOTOR |
| USAGE |
| NUMBER OF RAID GROUPS/RAID GROUP NUMBER |
| NUMBER OF REVOLUTIONS |
| BLOCK COUNT |
| PROGRESS OF REBUILDING |
| PROGRESS OF PATROL |

| NUMBER OF REVOLUTIONS |
| --- |
| DATA TRANSFER RATE |
| DISK MODEL |
| VERSION OF FIRMWARE |
| USED/UNUSED STATE OF DISK CACHE |
| CAPACITY OF DISK CACHE |

DISK ARRAY CONTROL APPARATUS

CROSS-REFERENCE TO RELATED APPLICATIONS

This application is based upon and claims the benefit of priority of the prior Japanese Patent Application No. 2009-029263, filed on Feb. 12, 2009, the entire contents of which are incorporated herein by reference.

FIELD

The embodiment discussed herein is related to a disk array control apparatus that controls a disk array system.

BACKGROUND

In the past, a disk array system such as a RAID (Redundant Array of Inexpensive/Independent Disks) system has included a mechanism that maintains redundancy.

For example, when one of the disks included in a RAID group becomes unavailable due to a failure and the redundancy is lost, the RAID system reconstructs data in a hot spare disk instead of the unavailable disk. Thus, the redundancy recovers (for example, refer to Japanese Laid-open Patent Publication No. 07-098635). The processing is generally called rebuilding processing.

In order to perform the rebuilding processing, the disk to be rebuilt is determined as follows:

(1) If a hot spare disk that has been dedicatedly assigned to a RAID group having a disk failure exists, the RAID system handles the hot spare disk as the target of the rebuilding processing.

The hot spare disk dedicatedly assigned to a specific RAID group is called a "dedicated hot spare disk" hereinafter.

(2) If no dedicated hot spare disks exist but a hot spare disk that can be assigned to an arbitrary RAID group exists, the RAID system handles the hot spare disk as the target of the rebuilding processing.

The hot spare disk that is available to an arbitrary RAID group is called a "global hot spare disk" hereinafter.

After determining the target of the rebuilding processing in this way, the RAID system performs the rebuilding processing on the hot spare disk determined as the target of the rebuilding processing.

The disks included in a RAID group have unique characteristics. For example, the disks have characteristics determined by various factors such as the numbers of rotation, the transfer rate, and an algorithm to be used in firmware for disk control.

Thus, when a disk having a different characteristic from the failing disk as a hot spare disk is used, there is a possibility that the characteristics before and after the occurrence of the failure of the entire RAID group may differ.

For example, there is a possibility that the responses by the RAID group may extremely differ between before a failure of a disk and after the rebuilding processing on the disk. Currently, from the viewpoint of costs, a dedicated hot spare disk can be limitedly assigned to only one RAID group.

For that reason, when a RAID group includes disks having a different characteristic from those in other RAID groups, for example, a dedicated hot spare disk may be required for each of the RAID groups to solve the problem that the characteristic of the RAID group may change.

When a RAID group already using a dedicated hot spare disk has a disk failure, the RAID group uses a global hot spare disk 220.

Since a global hot spare disk 220 is available to an arbitrary RAID group, there is a possibility that the global hot spare disk 220 having the most proper characteristic to the RAID group having a disk failure may have already been used by another RAID group.

Under this circumstance, it is difficult to solve the problem that the characteristic of the RAID group may change. Defining many dedicated hot spare disks for each RAID group can address the problem that the characteristic of the RAID group may change. However, in this case, the probability that all of the dedicated hot spare disks are used is low. This causes the problem that the utilization ratios of the disks are lowered.

SUMMARY

According to an aspect of the invention, a disk array controller for controlling a disk array having a redundant configuration with two or more disk devices and a spare disk provided for lack of redundancy in the disk array includes an array control unit for detecting the lack of redundancy in the disk array, and a rebuilding control unit for performing rebuilding processing on a dedicated spare disk device assigned to the disk array with the lack of redundancy detected by the array control unit, the dedicated spare disk being the spare disk dedicatedly assigned to the two or more disk arrays including the disk devices having a same characteristic as that of the spare disk.

The object and advantages of the invention will be realized and attained by unit of the elements and combinations particularly pointed out in the claims. It is to be understood that both the foregoing general description and the following detailed description are exemplary and explanatory and are not restrictive of the invention, as claimed.

DESCRIPTION OF EMBODIMENT

Figure 1:
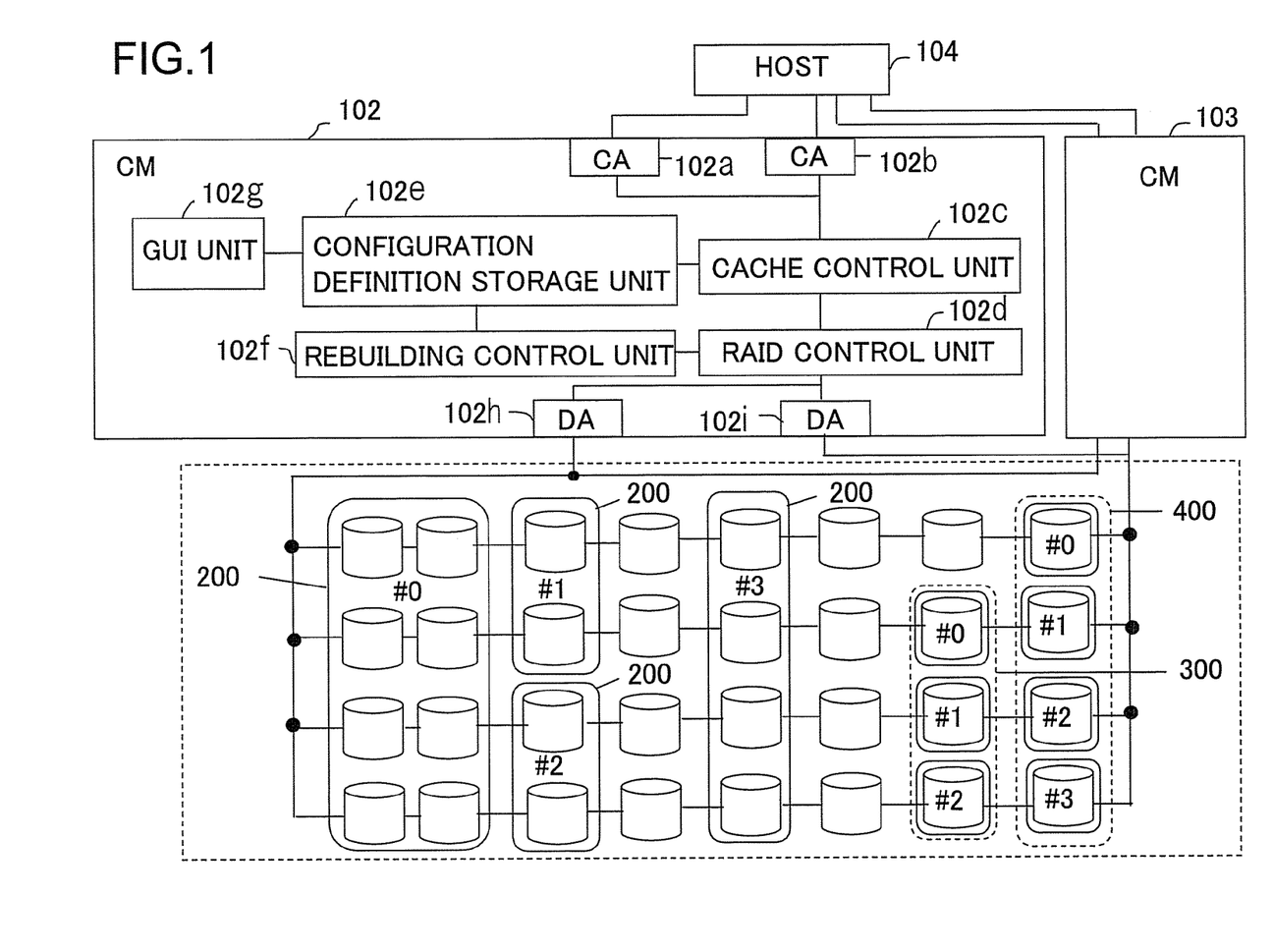
FIG. 1 is a diagram illustrating a configuration example of a disk array system according to an embodiment.

An embodiment will be described with reference to FIG. 1 to FIG. 12. FIG. 1 is a diagram illustrating a configuration example of a disk array system 100 according to the embodiment. The disk array system 100 includes a disk array apparatus 101 having components being plural magnetic disk devices, and CMs (controller modules, CMs corresponds to a disk array control apparatus in claims 102 and 103 that control the disk array apparatus 101.

The disk array apparatus 101 includes arbitrary combinations of plural magnetic disk devices as plural RAID groups 200 (a RAID group corresponds to a disk array described in claims). The term "RAID group" refers to a group of magnetic disk devices included in a RAID having plural magnetic disk devices. Notably, this embodiment does not limit the level of the RAID.

The disk array apparatus 101 illustrated in FIG. 1 is an example of the disk array apparatus 101 having the RAID groups 200 #0 to #3. Notably, each of the RAID groups 200 includes magnetic disk devices having the same characteristic. The expression "the same characteristic" is not limited to the case where the characteristics of the magnetic disk devices completely agree but includes cases where they practically nearly agree. For example, "the same characteristic" may be determined if the characteristics of the magnetic disk devices satisfy a first threshold value or second threshold value, which will be described later.

It is assumed that RAID groups 200 #0 to #2 include magnetic disk devices all having the same characteristic. It is assumed that the RAID group 200 #3 includes magnetic disk devices having a different characteristic from the characteristic of the magnetic disk devices included in the RAID group 200 #0 to #2.

The RAID group 200 #0 is a RAID group configuring a RAID with eight magnetic disk devices. Each of the RAID groups 200 #1 and #2 is a RAID group configuring a RAID with two magnetic disk devices. The RAID group 200 #3 is a RAID group configuring a RAID with four magnetic disk devices. Each RAID is a RAID at the level as required.

The disk array apparatus 101 includes dedicated hot spare disks 210 #0 to #3 and global hot spare disks 220 #0 to #2. The dedicated hot spare disks 210 #0 and #1 are hot spare disks dedicatedly assigned to the RAID groups 200 #0 to #2. The dedicated hot spare disks 210 #0 and #1 have the same characteristic as that of the magnetic disk devices included in the RAID groups 200 #0 to #2.

The dedicated hot spare disk 210 #2 is a hot spare disk dedicatedly assigned to the RAID group 200 #3. The dedicated hot spare disk 210 #2 has the same characteristic as the characteristic of the magnetic disk devices included in the RAID groups 200 #3.

The CM 102 includes CAs (channel adapters) 102a and 102b, a cache control unit 102c, a RAID control unit 102d, a configuration-definition storage unit 102e, a rebuilding control unit 102f, a GUI (graphical user interface) unit 102g and DAs (device adapters) 102h and 102i.

Each of the CAs 102a and 102b is an I/F (interface) to/from an I/O (input/output) apparatus, not illustrated, that the host 104 has. The cache control unit 102c controls a cache, not illustrated, provided within the cache control unit 102c.

For example, the cache control unit 102c may read a part of data stored in the disk array apparatus 101 and store it to the cache. The cache control unit 102c in accordance with a request from the host 104 may manipulate the data stored in the cache. The cache control unit 102c may write back the data that is no longer necessary from the cache to the disk array apparatus 101.

The RAID control unit 102d controls the disk array apparatus 101. For example, the RAID control unit 102d instructs to construct a RAID group 200 in the disk array apparatus 101 in accordance with the configuration definition information stored in the configuration-definition storage unit 102e.

By receiving the notification from the disk array apparatus 101 that a failure has occurred in a RAID group 200 and the redundancy has been lost or that there is a possibility that the redundancy will be lost, the RAID control unit 102d performs the rebuilding processing, which will be described later.

In this case, the RAID control unit 102d selects one arbitrary dedicated hot spare disk 210 from the plural dedicated hot spare disks 210 assigned to the RAID group 200 having a failure. Then, the RAID control unit 102d handles the selected dedicated hot spare disk 210 as the target of the rebuilding processing.

When the dedicated hot spare disks 210 assigned to the RAID group 200 having a failure are all in use, the RAID control unit 102d selects one arbitrary global hot spare disk 220 from the plural global hot spare disks 220. The RAID control unit 102d then handles the selected global hot spare disk 220 as the target of the rebuilding processing.

The RAID control unit 102d may further perform dedicated-hot-spare-disk assigning processing or dedicated-hot-spare-disk releasing processing, which will be described later, for example. The configuration-definition storage unit 102e stores the configuration definition information on a RAID group 200, the configuration definition information on a magnetic disk device, and information on a characteristic of a magnetic disk device.

The configuration definition information on a RAID group 200 will be called "RAID configuration definition information", hereinafter. The configuration definition information on a magnetic disk device included in a RAID group 200 will be called "disk configuration definition information", hereinafter. The information on a characteristic of a magnetic disk device will be called "disk characteristic information".

The rebuilding control unit 102f in accordance with an instruction from the RAID control unit 102d performs the rebuilding processing. When the magnetic disk device having a failure is replaced by maintenance work, for example, the rebuilding control unit 102f performs copy-back processing of copying the data in the hot spare disk to the replaced magnetic disk device.

Each of the DA 102h and 102i is an I/F for accessing the disk array apparatus 101. Since the CM 102 has the same configuration as that of the CM 103, the detailed description will be omitted.

FIG. 1 illustrates the CMs 102 and 103, which are duplexed CMs, but it is not intended that the disk array system 100 be limited to configurations with duplexed CMs. It is further not intended that the number of CAs or DAs be limited to the illustrated number.

The number of magnetic disk devices included in the disk array apparatus 101, and the RAID groups 200, dedicated hot spare disks 210 and global hot spare disks 220 within the disk array apparatus 101 are given only for illustration purposes, and it is not intended that the present technique is limited to the configuration illustrated in FIG. 1.

Figure 2:
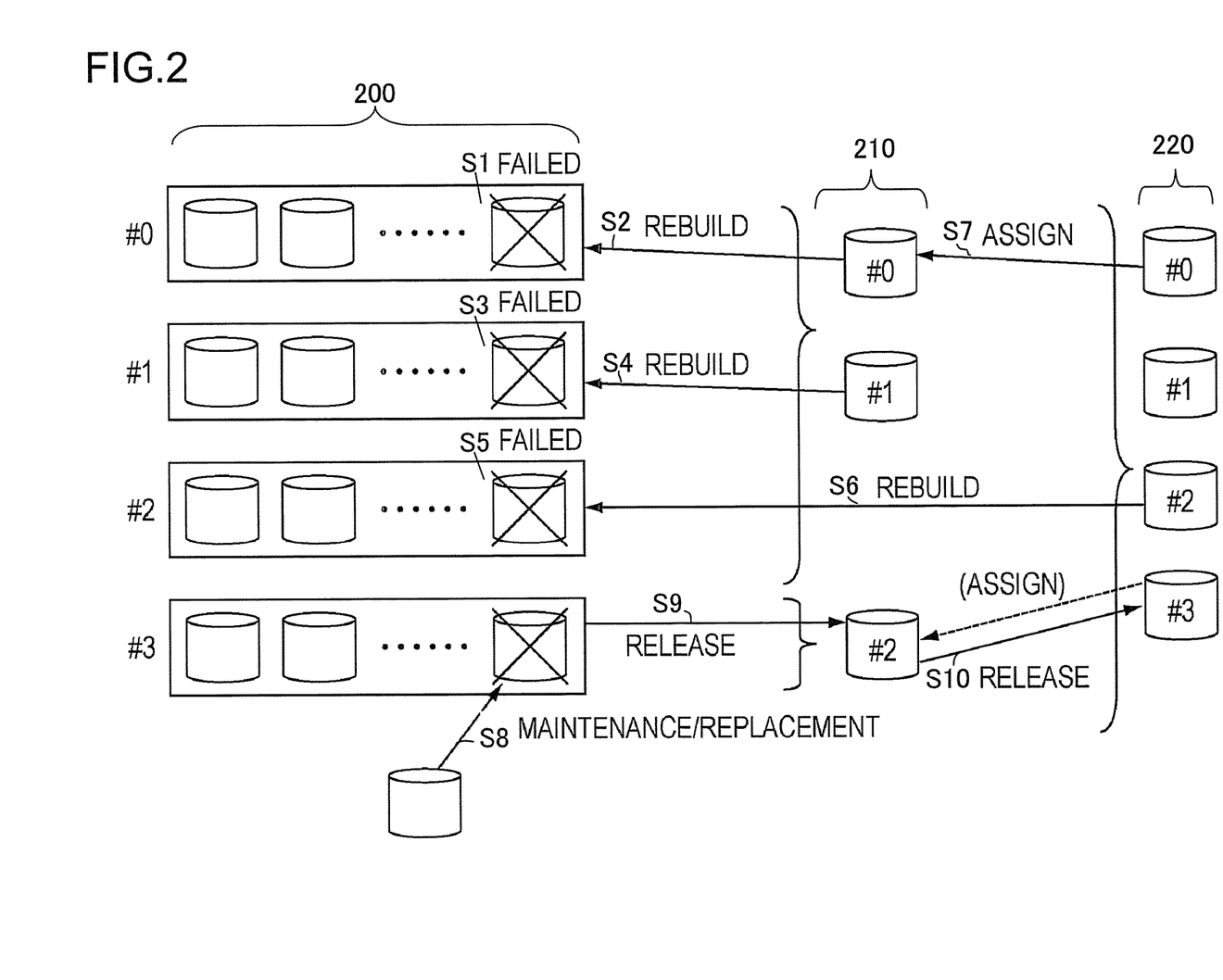
FIG. 2 is a diagram illustrating dedicated hot spare disks and global hot spare disks according to the embodiment.

FIG. 2 is a diagram illustrating the dedicated hot spare disks 210 and global hot spare disks 220 according to the embodiment. The RAID groups 200, dedicated hot spare disks 210 and global hot spare disks 220 illustrated in FIG. 2 are conceptual illustrations of those illustrated in FIG. 1.

As described above, the dedicated hot spare disk 210 #0 is a hot spare disk dedicatedly assigned to the RAID groups 200 #0, #1, and #2. The same is true for the dedicated hot spare disk 210 #1.

The dedicated hot spare disk 210 #2 is a dedicated hot spare disk 210 dedicatedly assigned to the RAID group 200 #3. Notably, the dedicated hot spare disk 210 according to this embodiment can be assigned to plural RAID groups 200, but for convenience of description, the RAID group 200 #3 is only assigned to the dedicated hot spare disk 210 #2.

The global hot spare disks 220 #0 to #3 are hot spare disks that can be used for all of the RAID groups 200 #0 to #3.

In step S1, if a magnetic disk device in the RAID group 200 #0 fails, in step S2, the RAID control unit 102d selects the dedicated hot spare disk 210 #0 from the dedicated hot spare disks 210 #0 and #1 assigned to the RAID groups 200 #0 to #2. Then, the RAID control unit 102d performs the rebuilding processing on the dedicated hot spare disk 210 #0.

In step S3, if a magnetic disk device in the RAID group 200 #1 fails, in step S4, the RAID control unit 102d performs the rebuilding processing on the dedicated hot spare disk 210 #1 assigned to the RAID groups 200 #0 to #2.

In step S5, if a magnetic disk device in the RAID group 200 #2 fails, in step S6, the RAID control unit 102d selects the global hot spare disk 220 #2, for example, from the global hot spare disks 220 #0 to #3. This is because the dedicated hot spare disks 210 are all already in use. The RAID control unit 102d performs the rebuilding processing on the global hot spare disk 220 #2.

In step S7, when the dedicated hot spare disks 210 #0 and #1 assigned to the RAID group 200 #0 are all in use, the RAID control unit 102d selects one global hot spare disk 220.

Here, the RAID control unit 102d selects the global hot spare disk 220 #0 having the same or substantially the same characteristic as the characteristic of the dedicated hot spare disk 210 #0 or #1. Then, the RAID control unit 102d assigns the selected global hot spare disk 220 to the dedicated hot spare disk 210 in the RAID group 200 #0.

In step S8, when a magnetic disk device in the RAID group 200 #3 is replaced by maintenance work, for example, in step S9, the RAID control unit 102d performs the rebuilding processing and copy-back processing on the replaced magnetic disk device. Then, the RAID control unit 102d releases the dedicated hot spare disk 210 #2 that has been used.

In step S10, when the dedicated hot spare disk 210 #2 is released and becomes available, the RAID control unit 102d releases the global hot spare disk 220 #3 assigned to the dedicated hot spare disk 210 in the RAID group 200 #3.

The numbers in parentheses, S1 to S10, in FIG. 2 are given for easy understanding, and it is not limited that the processing steps are performed in order from S1 to S10.

Figures 3, 4:
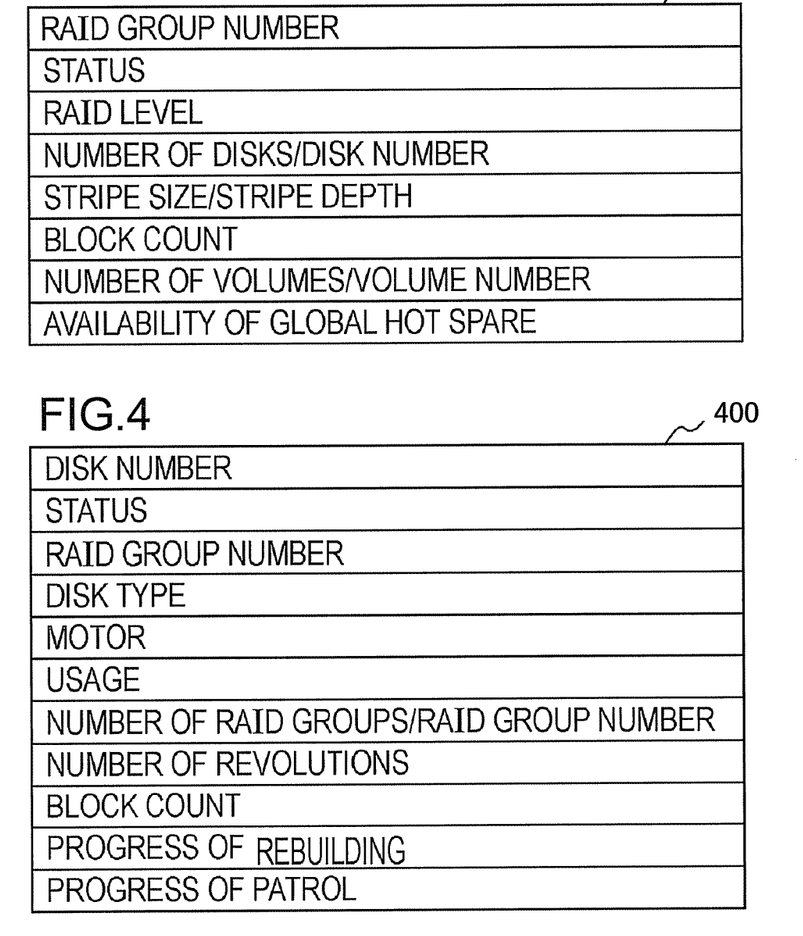
FIG. 3 is a diagram illustrating a configuration example of RAID configuration definition information according to the embodiment.
FIG. 4 is a diagram illustrating a configuration example of disk configuration definition information according to the embodiment.

FIG. 3 is a diagram illustrating a configuration example of the RAID configuration definition information according to the embodiment. Each of the RAID groups 200 is managed with RAID configuration definition information 300 illustrated in FIG. 3. The RAID configuration definition information 300 illustrated in FIG. 3 has the following set items:

The "RAID group number" is an identification number assigned to a RAID group 200. The "status" is information describing the state of the RAID group 200. For example, "normal", "no redundancy", "data under reconstruction" or "in failure" may be set. Notably, the expression that the RAID is "normal" refers to the state that the RAID has a redundant configuration. The "data under reconstruction" refers to the state during the rebuilding processing.

The "RAID level" is information indicating the RAID level of a RAID including magnetic disk devices in the RAID group 200. For example, "RAID #0", "RAID #1", . . . , "RAID #6" or "RAID #0+1" may be set.

The "number of disks/disk number" is information indicating the number of magnetic disk devices included in the RAID group 200, and the identification numbers assigned to the magnetic disk devices. The "stripe size/stripe depth" is information indicating the size (width) and depth of a stripe of each of the magnetic disk devices in the RAID group 200. Notably, this information is valid only when striping is performed.

The "block count" is information indicating the entire storage capacity of the RAID group 200. Notably, at the "block count", a maximum number of blocks that can be stored in the RAID group 200 is set. Thus, the product of the block size and the block count is equal to the entire storage capacity of the RAID group 200.

The "number of volumes/volume number" is information indicating the number of host volumes defined on the RAID group 200 and the host volume numbers. The "availability of global hot spare disk" is information indicating whether a global hot spare disk 220 is available or not. This information may be set to, for example, "available" or "unavailable".

FIG. 4 is a diagram illustrating a configuration example of the disk configuration definition information according to the embodiment. Each of the magnetic disk devices is managed with disk configuration definition information 400 illustrated in FIG. 4. The disk configuration definition information 400 illustrated in FIG. 4 has the following set items:

The "disk number" is an identification number assigned to a disk. The "status" is information describing the state of the disk. For example, "unused", "in use", "data under construction" or "in failure" may be set. Notably, the "unused", "in use" and "data under construction" are information pieces that may be set when the magnetic disk device is normally operating.

The "RAID group number" is the RAID group number of a RAID group 200 that the device belongs to if any. The "disk type" is information indicating the type of the disk. For example, "online", "near line" or "SSD (solid state drive)" may be set.

The "motor's state" is information describing the rotation condition of a motor for the magnetic disk device. For example, "normal mode" or "power-saving mode" may be set. The power-saving mode is a mode where the motor stops under the condition with no access from the host 104, for example.

The "usage" is information describing the usage of the disk. For example, "data", "global hot spare disk", "dedicated hot spare disk" or "unused" may be set. Notably, "data" is information indicating that the device is a magnetic disk device having registered with the RAID group 200 from the beginning.

When the "usage" has the setting of the "dedicated hot spare disk", the number of RAID groups 200 that the dedicated hot spare disk 210 is assigned to and the RAID group numbers of the RAID groups 200 are set as the "number of RAID groups/RAID group number".

The "number of rotation" is information indicating the number of rotation by the magnetic disk. The "block count" is information indicating the capacity of the magnetic disk device. The "progress of rebuilding" is information indicating the degree of progress of the rebuilding processing or copy-back processing being performed. The "progress of patrol" is information indicating the degree of progress of automatic check being performed on the medium plane of the disk.

Figure 5:
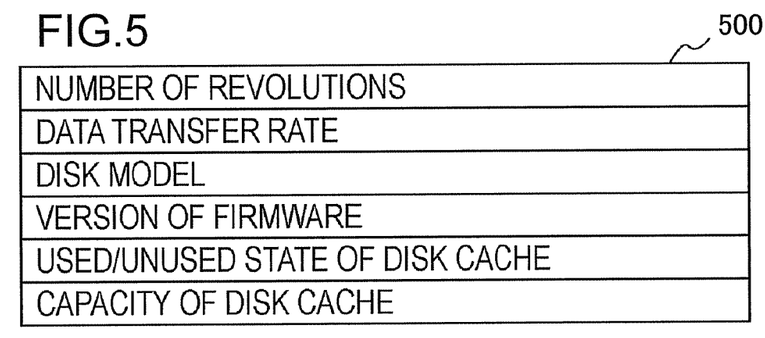
FIG. 5 is a diagram illustrating a configuration example of disk characteristic information according to the embodiment.

FIG. 5 is a diagram illustrating a configuration example of the disk characteristic information according to the embodiment. Disk characteristic information 500 illustrated in FIG. 5 has the following set items. The "number of rotation" is information indicating the number of rotation of the magnetic disk. The "number of rotation" is the same information as the "number of rotation" included in the disk configuration definition information 400.

The "data transfer rate" is information indicating an average throughput performance of the magnetic disk device. Notably, the "data transfer rate" may be "data transfer rate for each area". The average throughput performance of the magnetic disk device is provided because the data transfer rates differ between the outer tracks and the inner tracks of a magnetic disk.

The "disk model" is information indicating the model of the magnetic disk device. The "version of firmware" is information indicating the version number of firmware in operation in the magnetic disk device.

The "used/unused state of disk cache" is information indicating whether a disk cache is used or not. For example, "used" or "unused" may be set. The "capacity of disk cache" is information indicating the capacity of a disk cache in the magnetic disk device.

Figure 6:
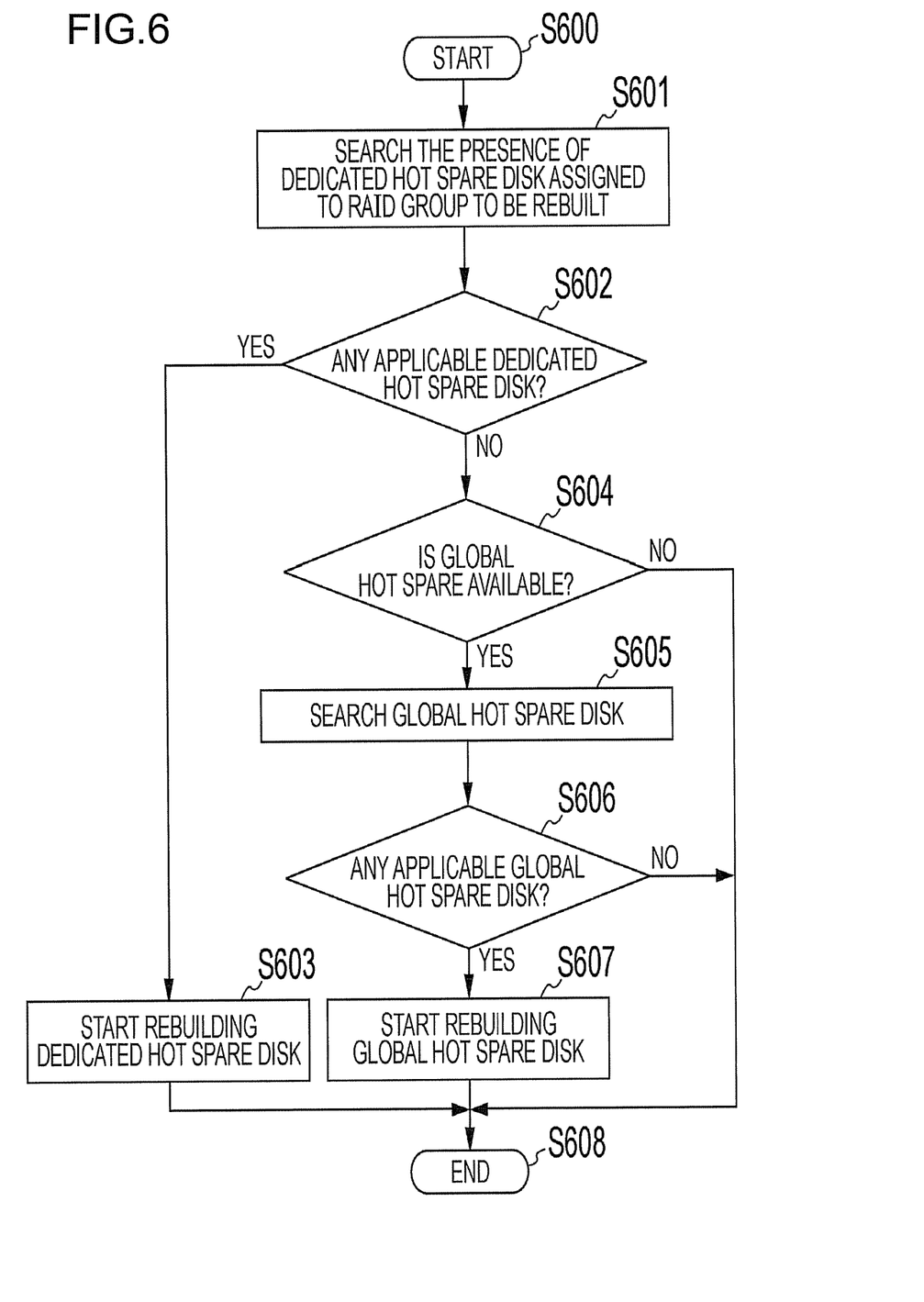
FIG. 6 is a flowchart illustrating rebuilding processing on the disk array system according to the embodiment.

FIG. 6 is a flowchart illustrating the rebuilding processing on the disk array system 100 according to the embodiment. When the RAID control unit 102*d* detects that a failure has occurred in a magnetic disk device in a RAID group 200 included in the disk array apparatus 101 or that a failure has occurred in a magnetic disk device, for example, and the magnetic disk device has become unavailable, the RAID control unit 102*d* moves the processing to step S601.

The RAID group 200 including the magnetic disk device that requires the rebuilding processing because a failure, for example, has occurred in the magnetic disk device or a failure, for example, has occurred in the magnetic disk device and the magnetic disk device has become unavailable will be called a "rebuilding-target RAID group", hereinafter.

In step S601, the RAID control unit 102*d* searches the presence of a dedicated hot spare disk 210 assigned to the rebuilding-target RAID group 200. For example, the RAID control unit 102*d* may refer to the configuration-definition storage unit 102*e*. Then, the RAID control unit 102*d* searches the disk configuration definition information having the settings of the "unused" at the "status", the "dedicated hot spare disk" at the "usage" and the RAID group number of the rebuilding-target RAID group 200 at the "number of RAID groups 200/RAID group number".

In step S602, if the search in step S601 detects the applicable disk configuration definition information, the RAID control unit 102*d* determines that there is a dedicated hot spare disk 210 assigned to the rebuilding-target RAID group 200. Then, the RAID control unit 102*d* moves the processing to step S603 (S602: YES).

The dedicated hot spare disk 210 in the disk configuration definition information detected in step S602 or step S1002, which will be described later, will be called a "rebuilding-target dedicated hot spare disk", hereinafter.

In step S603, the RAID control unit 102*d* instructs the rebuilding processing on the rebuilding-target dedicated hot spare disk 210 to the rebuilding control unit 101*f*. The rebuilding control unit 101*f* changes the "status" in the disk configuration definition information on the rebuilding-target dedicated hot spare disk 210 to the "data under construction".

Then, the rebuilding control unit 101*f* performs the rebuilding processing on the rebuilding-target dedicated hot spare disk 210.

When the rebuilding processing completes, the rebuilding control unit 101*f* changes the "status" in the disk configuration definition information on the rebuilding-target dedicated hot spare disk 210 to the "in use". Then, the rebuilding control unit 101*f* ends the rebuilding processing (step S608).

In step S602, the search in step S601 does not detect any applicable disk configuration definition information, the RAID control unit 102*d* determines that there is no rebuilding-target dedicated hot spare disks 210. Then, the RAID control unit 102*d* moves the processing to step S604 (S602: NO).

In step S604, whether the rebuilding-target RAID group 200 can use a global hot spare disk 220 or not is determined. For example, the RAID control unit 102*d* may refer to the RAID configuration definition information on the rebuilding-target RAID group 200 stored in the configuration-definition storage unit 102*e*.

If the "available" is set at the "availability of global hot spare disk" in the RAID configuration definition information, the RAID control unit 102*d* determines that a global hot spare disk 220 is available. Then, the RAID control unit 102*d* moves the processing to step S605 (step S604: YES).

If the "unavailable" is set at the "availability of global hot spare disk" in the RAID configuration definition information, the RAID control unit 102*d* determines that no global hot spare disks 220 are available. Then, the RAID control unit 102*d* moves the processing to step S608 (step S604: NO).

In this case, the RAID control unit 102*d* ends the processing without performing the rebuilding processing. Then, the RAID control unit 102*d* waits for the replacement of the magnetic disk device having a failure, for example, by maintenance work, for example.

In step S605, the RAID control unit 102*d* searches a global hot spare disk 220. For example, the RAID control unit 102*d* may refer to the configuration-definition storage unit 102*e*. Then, the RAID control unit 102*d* searches the disk configuration definition information having the settings of the "unused" at the "status" and the "global hot spare disk" at the "usage".

In step S606, if the search in step S605 detects the applicable disk configuration information, the RAID control unit 102*d* determines that there is a global hot spare disk 220 available. Then, the RAID control unit 102*d* moves the processing to steps S607 (S606: YES).

The global hot spare disk 220 detected in step S606 is handled as the target of the rebuilding processing. The global hot spare disk 220 detected in step S606 or step S1006, which will be described later, will be called a "rebuilding-target global hot spare disk", hereinafter.

If it is determined in step S606 that the search in step S605 does not detect the applicable disk configuration information, the RAID control unit 102*d* determines that there is no rebuilding-target global hot spare disks 220 and moves the processing to step S608 (S606: NO).

In step S607, the RAID control unit 102*d* instructs the rebuilding processing on the rebuilding-target global hot spare disk 220 to the rebuilding control unit 101*f*. The rebuilding control unit 101*f* changes the "status" in the disk configuration definition information on the rebuilding-target global hot spare disk 220 to the "data under construction". Then, the rebuilding control unit 101*f* performs the rebuilding processing on the rebuilding-target global hot spare disk 220.

When the rebuilding processing completes, the rebuilding control unit 101*f* changes the "status" in the disk configuration definition information on the rebuilding-target global hot spare disk 220 to "in use". Then, the rebuilding control unit 101*f* ends the rebuilding processing (step S608).

Notably, the processing described above may be performed by the rebuilding control unit 102*f* instead of the RAID control unit 102*d*. Since the CM 102 and the CM 103 are duplexed, the processing described above may be performed by the CM 102 or be performed by the CM 103. The processing in step S604 is not required.

Figure 7:
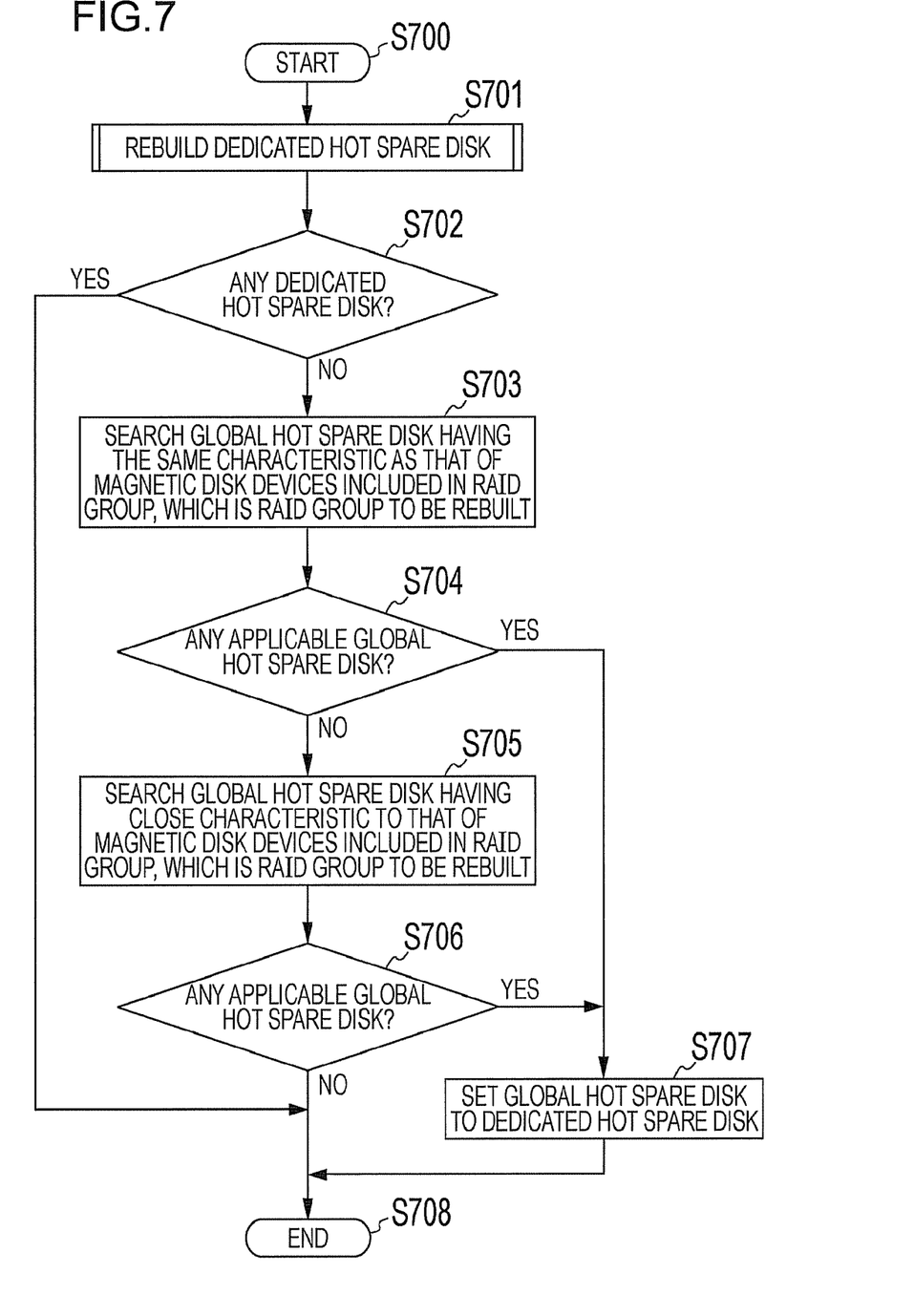
FIG. 7 is a flowchart illustrating dedicated-hot-spare-disk assigning processing that assigns a global hot spare disk as a dedicated hot spare disk.

FIG. 7 is a flowchart illustrating dedicated-hot-spare-disk assigning processing that assigns a global hot spare disk 220 as a dedicated hot spare disk 210. In step S701, when the rebuilding processing by the rebuilding control unit 101*f* completes, the RAID control unit 102*d* moves the processing to step S702.

In step S702, the RAID control unit 102*d* determines whether there is any unused dedicated hot spare disk 210 assigned to the RAID group 200 that has been the rebuilding-target RAID group 200 or not. For example, the RAID control unit 102*d* may refer to the configuration-definition storage unit 102*e*. Then, the RAID control unit 102*d* searches disk configuration definition information having the settings of the "unused" at the "status", the "dedicated hot spare disk" at the "usage" and the number of the RAID group 200 that has been the rebuilding-target RAID group 200 at the "RAID group number".

If the applicable disk configuration definition information is detected, the RAID control unit 102*d* determines that there is an unused dedicated hot spare disk 210 assigned to the RAID group 200 that has been the rebuilding-target RAID group 200. Then, the RAID control unit 102*d* moves the processing to step S708 (step S702: YES). The RAID control unit 102*d* ends the dedicated-hot-spare-disk 210 assigning processing (step S708).

If the applicable disk configuration definition information is not detected, the RAID control unit 102*d* determines that there are no unused dedicated hot spare disks 210 assigned to the RAID group 200 that has been the rebuilding-target RAID group 200. Then, the RAID control unit 102*d* moves the processing to step S703 (step S702: NO).

In step S703, the RAID control unit 102*d* searches a global hot spare disk 220 having the same characteristic as the characteristic of the magnetic disk devices included in the RAID group 200 that has been the rebuilding-target RAID group 200. For example, the RAID control unit 102*d* may refer to the configuration-definition storage unit 102*e*. Then, the RAID control unit 102*d* acquires the disk characteristic information of an arbitrary magnetic disk device included in the RAID group 200 that has been the rebuilding-target RAID group 200.

The disk characteristic information on an arbitrary magnetic disk device included in the RAID group 200 that has been the rebuilding-target RAID group 200 will be called "reference disk characteristic information", hereinafter. The RAID control unit 102*d* searches the same disk characteristic information as the reference disk characteristic information in the disk characteristic information on the global hot spare disks 220. The RAID control unit 102*d* determines that the disk characteristic information pieces are the "same" if the number of the matched items among the items defined in the disk characteristic information is equal to or higher than a first threshold value.

The first threshold value may be the number of all items defined in the disk characteristic information. Alternatively, the first threshold value may be a value lower than the number of all items defined in the disk characteristic information, as required. However, the first threshold value may only be required to be an integer value equal to or higher than 2.

If the same disk characteristic information as the reference disk characteristic information is detected in step S704, the RAID control unit 102*d* determines that there is the applicable global hot spare disk 220 or disks. Then, the RAID control unit 102*d* moves the processing to step S707 (S704: YES).

If the same disk characteristic information as the reference disk characteristic information is not detected in step S704, the RAID control unit 102*d* determines that there is no applicable global hot spare disks 220. Then, the RAID control unit 102*d* moves the processing to step S705 (S704: NO).

In step S705, the RAID control unit 102*d* searches a global hot spare magnetic disk having a closer characteristic to the characteristic of the magnetic disk devices included in the RAID group 200 that has been the rebuilding-target RAID group 200. For example, the RAID control unit 102*d* searches close disk characteristic information to the reference disk characteristic information from the disk characteristic information on the global hot spare disks 220. The RAID control unit 102*d* determines that the disk characteristic information is close if the number of the matched items in the items defined in the disk characteristic information is equal to or higher than a second threshold value and is lower than the first threshold value.

The second threshold value may be defined in the range of integer values lower than the first threshold value and equal to or higher than 1, as required. If, in step S706, disk characteristic information closer to the reference disk characteristic information is detected, the RAID control unit 102*d* determines that there is the applicable global hot spare disk 220 or disks. Then, the RAID control unit 102*d* moves the processing to step S707 (S706: YES).

If, in step S706, no disk characteristic information closer to the reference disk characteristic information is detected, the RAID control unit 102*d* determines that there is no applicable global hot spare disks 220. Then, the RAID control unit 102*d* moves the processing to step S708 (S706: NO).

In step S707, the RAID control unit 102*d* sets the global hot spare disk 220 detected in step S704 or S706 to a dedicated hot spare disk 210 in the RAID group 200 that has been the rebuilding-target RAID group 200. For example, the RAID control unit 102*d* may additionally set the "dedicated hot spare disk" to the "usage" in the disk configuration definition information on the global hot spare disk 220 detected in step S704 or S706.

According to this embodiment, for the identification of the dedicated hot spare disk 210 that has been a global hot spare disk 220, the "global hot spare disk" set at the "usage" in the disk configuration definition information is held.

Thus, the "usage" in the disk configuration definition information has the settings of the "global hot spare disk" and the "dedicated hot spare disk". When the "usage" in the disk configuration definition information has the settings of "global hot spare disk" and the "dedicated hot spare disk", the RAID control unit 102*d* determines that the corresponding disk is a dedicated hot spare disk 210.

Instead of the additional setting of the "dedicated hot spare disk" to the "usage" in the disk configuration definition information, the setting of "dedicated hot spare disk that has been global hot spare disk" may be provided separately.

The RAID control unit 102*d* adds 1 to the "number of RAID groups" of the "number of RAID groups/RAID group number" in the disk configuration definition information. The RAID control unit 102*d* sets the RAID group number of the RAID group 200 that has been the rebuilding-target RAID group 200 to the "RAID group number" of the "number of RAID groups/RAID group number" in the disk configuration definition information". Then, the RAID control unit 102*d* ends the dedicated-hot-spare-disk assigning processing (step S708).

Figure 8:
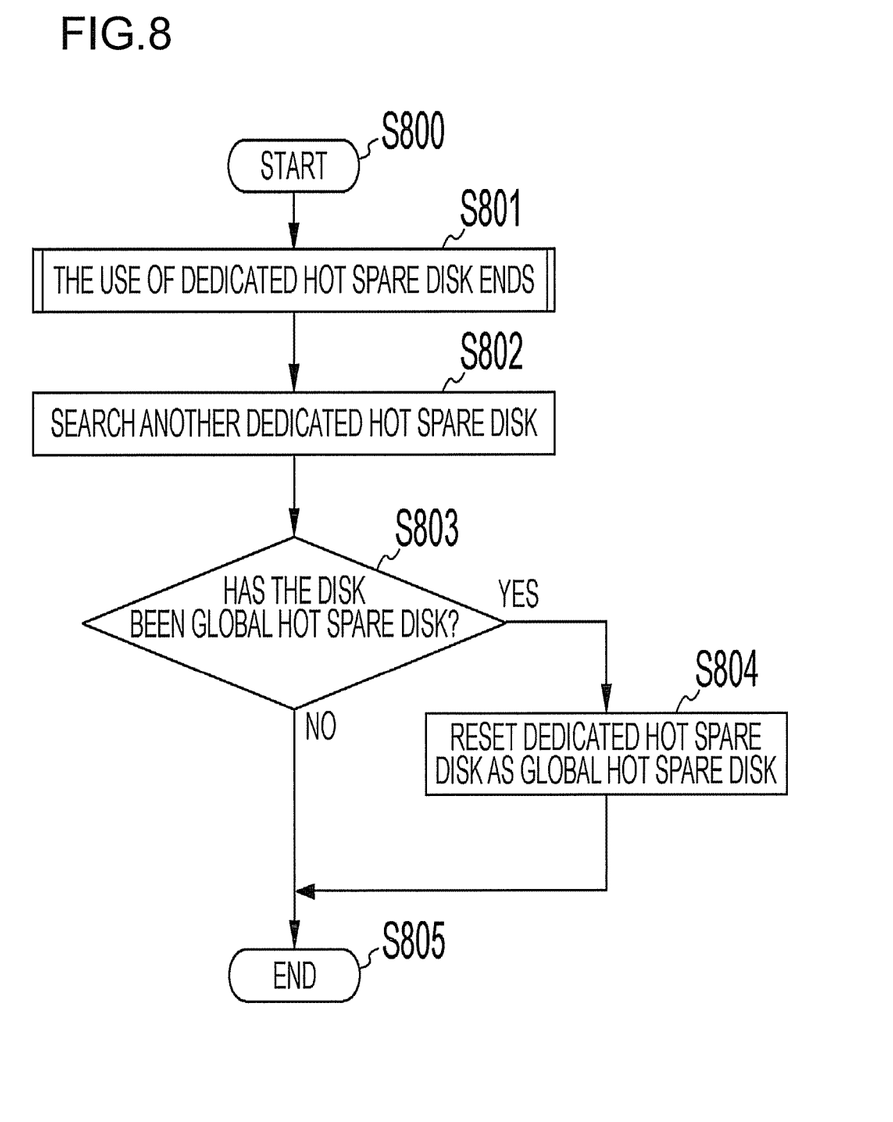
FIG. 8 is a flowchart illustrating dedicated-hot-spare-disk releasing processing that releases the global hot spare disk assigned as a dedicated hot spare disk.

FIG. 8 is a flowchart illustrating dedicated-hot-spare-disk releasing processing that releases the global hot spare disk 220 assigned as a dedicated hot spare disk 210.

In step S801, when a failing magnetic disk device is replaced and the dedicated hot spare disk 210 is released by maintenance work, for example, the RAID control unit 102*d* moves the processing to step S802.

The expression, "dedicated hot spare disk is released" refers to the state that a dedicated hot spare disk 210 comes to have the unused state because rebuilding processing/copyback processing has been performed on the replaced new magnetic disk device.

In step S802, the RAID control unit 102*d* searches another dedicated hot spare disk 210 assigned to the RAID group 200 that has used the dedicated hot spare disk 210 released in step S801. For example, the RAID control unit 102*d* may refer to the configuration-definition storage unit 102*e*. Then, the RAID control unit 102*d* searches the disk configuration definition information having at the "RAID group number" the setting of the RAID group number of the RAID group 200 to which the dedicated hot spare disk 210 released in step S801 has been assigned.

In the disk configuration definition information detected by the search, the RAID control unit 102*d* further searches information having the "unused" at the "status" and the "dedicated hot spare disk" at the "usage".

In step S803, the RAID control unit 102*d* determines whether the dedicated hot spare disk 210 in the disk configuration definition information detected by the search in step S802 is the dedicated hot spare disk 210 that has been a global hot spare disk 220 or not.

The dedicated hot spare disk 210 that has been a global hot spare disk 220 is a global hot spare disk 220 set to a dedicated hot spare disk 210 by the processing in step S707 illustrated in FIG. 6.

If the "dedicated hot spare disk" and "global hot spare disk" are set in the "usage" in the disk configuration definition information, the RAID control unit 102*d* determines that the disk is the dedicated hot spare disk 210 that has been a global hot spare disk 220.

If the "dedicated hot spare disk" is only set at the "usage" in the disk configuration definition information, the RAID control unit 102*d* determines that the disk is not the dedicated hot spare disk 210 that has been a global hot spare disk 220.

If the RAID control unit 102*d* determines that the dedicated hot spare disk 210 detected in step S802 has been a global hot spare disk 220, the RAID control unit 102*d* moves the processing to step S804 (step S803: YES).

If the RAID control unit 102*d* determines that the dedicated hot spare disk 210 detected in step S802 has not been a global hot spare disk 220, the RAID control unit 102*d* moves the processing to step S805 (step S803: NO). Then, the RAID control unit 102*d* ends the dedicated-hot-spare-disk releasing processing (step S805).

In step S804, the RAID control unit 102*d* resets the dedicated hot spare disk 210 detected in step S802 to a global hot spare disk 220. For example, the RAID control unit 102*d* deletes the "dedicated hot spare disk" set at the "usage" in the disk configuration definition information detected in step S802. Thus, the "usage" in the disk configuration definition information only has the setting of the "global hot spare disk".

After the dedicated hot spare disk 210 that has been a global hot spare disk 220 is reset to the global hot spare disk 220, the RAID control unit 102*d* moves the processing to step S805. Then, the RAID control unit 102*d* ends the dedicated-hot-spare-disk releasing processing (step S805).

Figure 9:
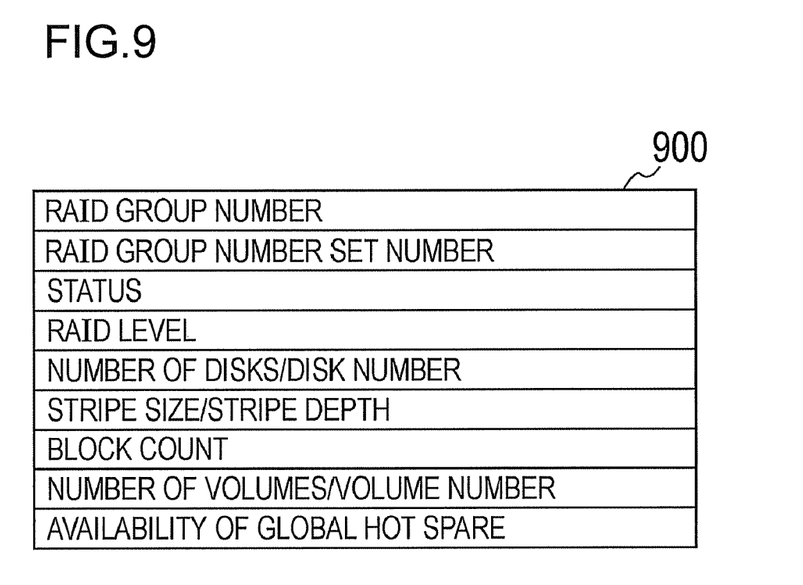
FIG. 9 is a diagram illustrating a configuration example of the RAID configuration definition information when a dedicated hot spare disk is to be assigned to a RAID group set.

FIG. 9 is a diagram illustrating a configuration example of the RAID configuration definition information when a dedicated hot spare disk 210 is to be assigned to a RAID group set. The term "RAID group set" refers to a set of two or more RAID groups 200. The number of RAID groups 200 included in a RAID group 200 set may be any number equal to or higher than 2 as required.

Each RAID group 200 is managed by RAID configuration definition information 900 illustrated in FIG. 9. The RAID configuration definition information 900 illustrated in FIG. 9 further includes a "RAID group set number" in addition to the set items in the RAID configuration definition information 300 illustrated in FIG. 3. The "RAID group set number" refers to information indicating the number of the RAID group 200 set that a RAID group 200 belongs to.

Figure 10:
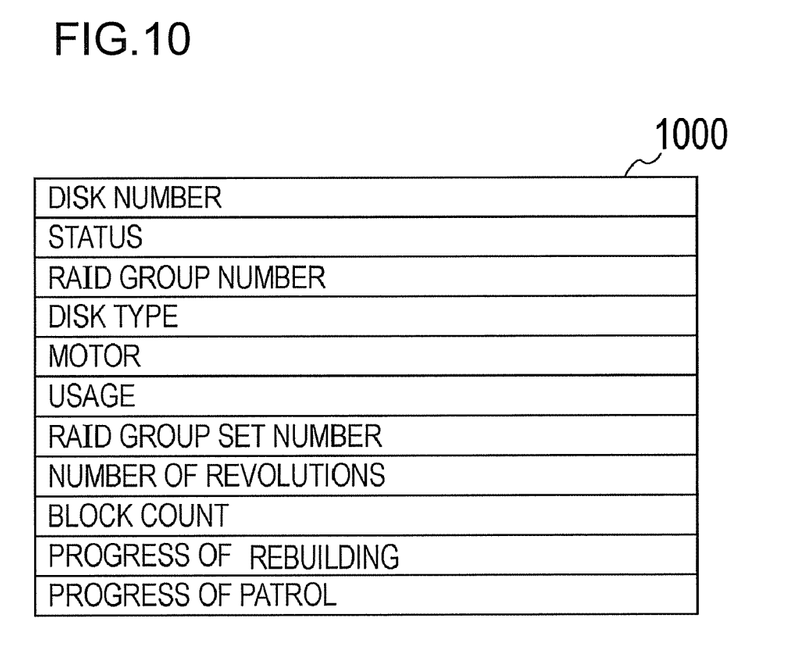
FIG. 10 is a diagram illustrating a configuration example of the disk configuration definition information when a dedicated hot spare disk is to be assigned to a RAID group set.

FIG. 10 is a diagram illustrating a configuration example of the disk configuration definition information when a dedicated hot spare disk 210 is to be assigned to a RAID group 200 set. Each magnetic disk device is managed by disk configuration definition information 1000 illustrated in FIG. 10.

The disk configuration definition information 1000 includes the same set items as those in the disk configuration definition information 400 illustrated in FIG. 4. However, the disk configuration definition information 1000 has the "RAID group set number" instead of the "number of RAID groups/RAID group number".

If the "usage" has the setting of "dedicated hot spare disk", the "RAID group set number" is information indicating the RAID group 200 set number of the RAID group 200 set to which a dedicated hot spare disk 210 is assigned.

Figure 11:
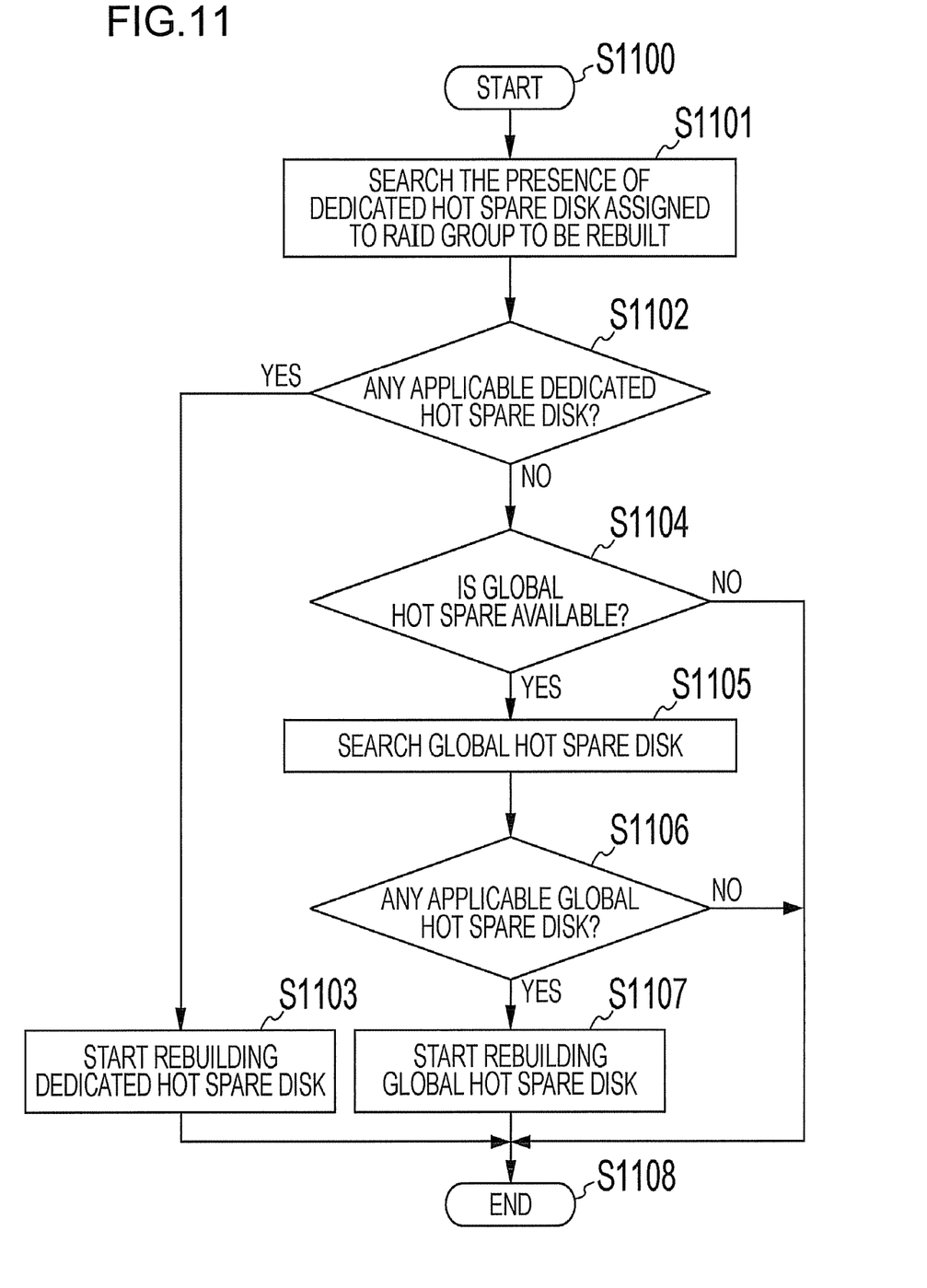
FIG. 11 is a flowchart illustrating the rebuilding processing on the disk array system when a dedicated hot spare disk is to be assign to a RAID group set.

FIG. 11 is a flowchart illustrating the rebuilding processing on the disk array system 100 when a dedicated hot spare disk 210 is to be assigned to a RAID group 200 set. When the RAID control unit 102*d* detects that a failure has occurred in a magnetic disk device in an arbitrary RAID group 200 included in a RAID group 200 set or a failure, for example, has occurred in a magnetic disk device and the magnetic device has become unavailable, the RAID control unit 102*d* moves the processing to step S1101.

The RAID group 200 set including a rebuilding-target RAID group 200 as a component will be called "rebuilding-target RAID group set", hereinafter. In step S1101, the RAID control unit 102*d* searches the presence of any dedicated hot spare disk 210 assigned to a rebuilding-target RAID group 200 set. For example, the RAID control unit 102*d* may refer to the configuration-definition storage unit 102*e*. Then, the RAID control unit 102*d* searches disk configuration definition information having the settings of the "unused" at the "status", "dedicated hot spare disk" at the "usage" and the RAID group 200 set number of the rebuilding-target RAID group 200 set at the "RAID group set number".

In step S1102, if the search in step S1101 detects some applicable disk configuration definition information, the RAID control unit 102*d* determines that there is the dedicated hot spare disk 210 assigned to the rebuilding-target RAID group 200 set. Then, the RAID control unit 102*d* moves the processing to step S1103 (S1102: YES).

Since the processing in step S1103 to S1108 is similar to the processing in step S603 to S608 illustrated in FIG. 6, the detailed descriptions will be omitted. The dedicated-hot-spare-disk assigning processing in the disk array system 100 when a dedicated hot spare disk 210 is to be assigned to a RAID group 200 set is similar to the processing illustrated in FIG. 7.

The dedicated-hot-spare-disk releasing processing in the disk array system 100 when a dedicated hot spare disk 210 is to be assigned to a RAID group 200 set is similar to the processing illustrated in FIG. 8.

The dedicated hot spare disk 210 and the global hot spare disk 220 will collectively be called "hot spare disk", hereinafter. In the past, there have been no functions that change the hot spare disk assigned at the beginning of the rebuilding processing to another hot spare disk when the hot spare disks are in use.

For that reason, it has been difficult to shift to a more proper hot spare disk from the viewpoints of the storage capacity and/or the number of rotation than the hot spare disk in use in the RAID group 200. There has been possibility that, under some circumstances, the rebuilding processing might be prevented to start when a magnetic disk device failed. The case is assumed, for example, in which only one 750-GB hot spare disk is assigned to a RAID group 200-A including 500-GB magnetic disk devices and a RAID group 200-B including 750-GB magnetic disk devices.

When one magnetic disk device in the RAID group 200-A fails, the rebuilding processing is performed on a hot spare disk. Here, even when a 500-GB hot spare disk is newly added and a magnetic disk device in the RAID group 200-B fails, for example, it is difficult to start the rebuilding processing because there is no unused hot spare disk having a sufficient capacity available.

Figure 12:
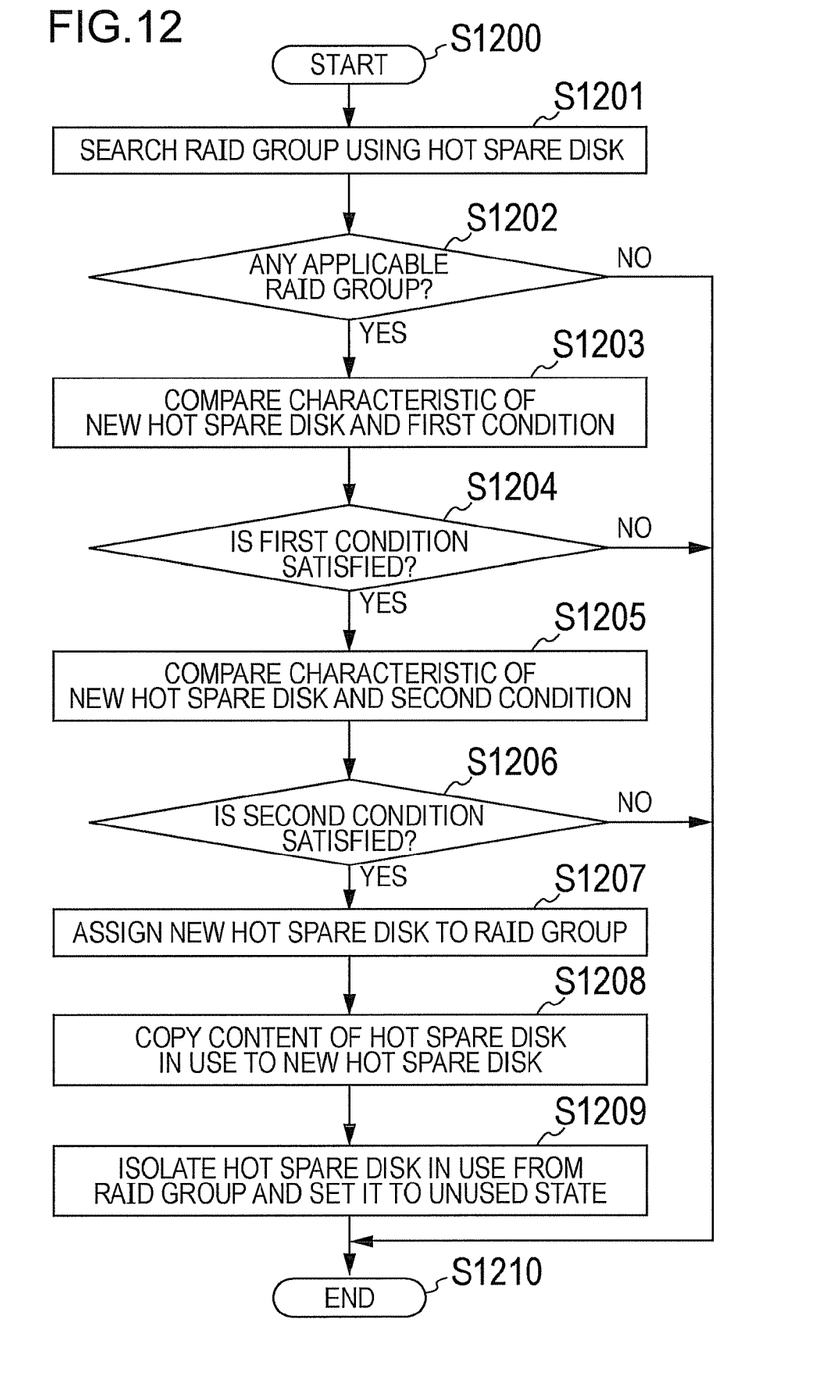
FIG. 12 is a flowchart illustrating optimization processing on the hot spare disk according to the embodiment.

In order to solve this, the hot spare disk is optimized by performing the following processing in the disk array system 100 according to this embodiment: FIG. 12 is a flowchart illustrating optimization processing on the hot spare disk according to the embodiment.

If the RAID control unit 102*d* detects, for example, that a hot spare disk is newly added by maintenance work, for example, or that the completion of the copy-back processing causes the hot spare disk to have the "unused" state, the RAID control unit 102*d* moves the processing to step S1201.

The hot spare disk newly added by maintenance work, for example, or the hot spare disk having the "unused" state as a result of the completion of the copy-back processing will be called "new hot spare disk", hereinafter.

In step S1201, the RAID control unit 102*d* searches the RAID group 200 using the hot spare disk. For example, the RAID control unit 102*d* may refer to the configuration-definition storage unit 102*e*. Then, the RAID control unit 102*d* searches the disk configuration definition information having the settings of "in use" at the "status" and "hot spare disk" at the "usage". However, the disk configuration definition information of the new hot spare disk is excluded.

In step S1202, if the search in step S1201 detects the applicable disk configuration definition information, the RAID control unit 102*d* determines that there is a RAID group 200 that is using the hot spare disk.

Then, the RAID control unit 102*d* acquires the "RAID group number" from the detected disk configuration definition information. Then, the RAID control unit 102*d* moves the processing to step S1203 (step S1202: YES).

In step S1202, if the search in step S1201 does not detect the applicable disk configuration definition information, the RAID control unit 102*d* determines that there are no RAID groups 200 that are using the hot spare disk. Then, the RAID control unit 102*d* moves the processing to step S1210 (step S1202: NO).

The RAID group 200 detected in step S1202 will be called an "optimization-target RAID group". The hot spare disk being used in the optimization-target RAID group 200 will be called an "optimization-target hot spare disk", hereinafter.

In step S1203, the RAID control unit 102*d* compares a characteristic of the new hot spare disk and a first condition. Here, the first condition is that the following two requirements be satisfied at the same time.

(1) The storage capacity is equal to or smaller than that of the optimization-target hot spare disk; and (2) The storage capacity is in the range of the storage capacity usable in the optimization-target RAID group 200, where the "usable storage capacity" refers to a minimum storage capacity usable in the optimization-target RAID group 200, for example. For example, the RAID control unit 102*d* may refer to the configuration-definition storage unit 102*e*. Then, the RAID control unit 102*d* acquires a storage capacity Q1 from the disk characteristic information on the new hot spare disk.

Similarly, the RAID control unit 102*d* acquires a storage capacity Q2 from the disk characteristic information on the optimization-target hot spare disk. The RAID control unit 102*d* further acquires a storage capacity Q3 from the RAID configuration definition information on the optimization-target RAID group 200. Then, the RAID control unit 102*d* compares the storage capacity Q1 and the storage capacity Q2 or Q3.

In step S1204, if the storage capacity Q1 is equal to or smaller than the storage capacity Q2, and the storage capacity Q1 is equal to or larger than the storage capacity Q3, the RAID control unit 102*d* determines that the characteristic of the new hot spare disk satisfies the first condition. Then, the RAID control unit 102*d* moves the processing to step S1205 (step S1204: YES).

In step S1204, if the storage capacity Q1 is larger than the storage capacity Q2 or if the storage capacity Q1 is smaller than the storage capacity Q2, the RAID control unit 102*d* determines that the characteristic of the new hot spare disk does not satisfy the first condition. Then, the RAID control unit 102*d* moves the processing to step S1210 (step S1204: NO).

In step S1205, the RAID control unit 102*d* compares a characteristic of the new hot spare disk and a second condition. Here, the second condition is that the number of rotation R1 of the new hot spare disk is matched or substantially matched with the number of rotation R2 of the optimization-target hot spare disk. Notably, the expression "substantially matched" refers to the state that the number of rotation R1, for example, is in the range of the number of rotation R2±50%. For example, the RAID control unit 102*d* may refer to the configuration-definition storage unit 102*e*. Then, the RAID control unit 102*d* acquires the number of rotation R1 from the disk characteristic information on the new hot spare disk. Similarly, the RAID control unit 102*d* acquires the number of rotation R2 from the disk characteristic information on the optimization-target hot spare disk. Then, the RAID control unit 102*d* compares the numbers of rotation R1 and R2.

While, according to this embodiment, the number of rotation R2 of the optimization-target hot spare disk is used as the number of rotation to be compared with the number of rotation R1 of the new hot spare disk, the number of rotation of another magnetic disk device included in the optimization-target RAID group 200 may be used.

In step S1206, if the number of rotation R1 is in the range of the number of rotation R2±50%, the RAID control unit 102*d* determines that the characteristic of the new hot spare disk satisfies the second condition. Then, the RAID control unit 102d moves the processing to step S1207 (step S1206: YES).

In step S1206, if the number of rotation R1 is not in the range of the number of rotation R2±50%, the RAID control unit 102d determines that the characteristic of the new hot spare disk does not satisfy the second condition. Then, the RAID control unit 102d moves the processing to step S1210 (step S1206: NO).

In step S1207, the RAID control unit 102d assigns the new hot spare disk to the optimization-target RAID group 200. For example, the RAID control unit 102d may refer to the configuration-definition storage unit 102e. Then, the number of RAID groups 200 at the "number of RAID groups/RAID group number" in the disk configuration definition information on the new hot spare disk is incremented by 1. At the same time, the RAID control unit 102d additionally sets the RAID group number of the optimization-target RAID group 200 to the number at the "number of RAID groups/RAID group number".

In step S1208, the RAID control unit 102d copies the content of the optimization-target hot spare disk to the new hot spare disk. In step S1209, the RAID control unit 102d releases the optimization-target hot spare disk from the RAID group 200 and sets it to the "unused" state. For example, the RAID control unit 102d may refer to the configuration-definition storage unit 102e. Then, the RAID control unit 102d sets the "unused" to the "status" in the disk configuration definition information on the optimization-target hot spare disk.

The RAID control unit 102d further subtracts 1 from the "number of RAID groups 200" in the disk configuration definition information on the optimization-target hot spare disk. At the same time, the RAID control unit 102d deletes the RAID group number of the optimization-target RAID group 200 set at the "RAID group number".

Notably, in step S1208, the area being copied may be excluded from the area to be used for staging processing and write-back processing. Thus, even when an I/O instruction is received from the host 104, the copy processing can be continued without stopping the I/O processing on the host 104 side. In this case, in the write-back processing, data may be written to both areas of the copy-source area and the copy-destination area.

The processing in either steps S1203 and S1204 or steps S1205 and S1206 may not be performed. As described above, the dedicated hot spare disk 210 is dedicatedly assigned to one or two or more RAID groups 200 including magnetic disk devices having a same characteristic, like the dedicated hot spare disks 210 #0 and #1 illustrated in FIG. 2.

As a result, the CM 102 performs the processing in step S601 to S603 illustrated in FIG. 6 so that the CM 102 can perform the rebuilding processing while keeping the characteristic of the RAID groups 200 before the rebuilding processing.

Unlike the dedicated hot spare disks 210 #0 and #1 illustrated in FIG. 2, it is not important that one dedicated hot spare disk 210 is dedicatedly assigned to a RAID group 200 including one or two or more magnetic disk devices having the same characteristic, and plural dedicated hot spare disks 210 may be provided, as required.

As a result, even when plural RAID groups 200 require rebuilding dedicated hot spare disks 210 having the same characteristic, the CM 102 can perform the rebuilding processing on the RAID groups 200 while keeping the characteristic of the RAID groups 200 before the rebuilding processing.

If the CM 102 determines that there is no dedicated hot spare disks 210 available, the CM 102 performs the processing in steps S605 to S607 illustrated in FIG. 6 to perform the rebuilding processing on a global hot spare disk 220.

As a result, the CM 102 can recover the redundancy of the RAID group 200 even when there are no dedicated hot spare disks 210 available. On a RAID group 200 inhibiting the use of a global hot spare disk 220, the CM 102 does not recover the redundancy by the rebuilding processing on a global hot spare disk 220 (step S604).

Thus, the prevention of the change in characteristic of the RAID group 200 can have higher priority than the recovery of the redundancy. The CM 102, as illustrated in FIG. 7, detects that there are no longer dedicated hot spare disk 210 available because the dedicated hot spare disk 210 is rebuilt. Then, the CM 102 assigns the global hot spare disk 220 having the same characteristic as the characteristic of the magnetic disk devices included in the RAID group 200 that has been the rebuilding-target RAID group 200 as a dedicated hot spare disk 210.

Then, when the rebuilding processing is necessary, the CM 102 performs the rebuilding processing on the global hot spare disk 220 assigned as a dedicated hot spare disk 210.

As a result, even when there are no dedicated hot spare disks 210 available but the rebuilding processing is necessary, the CM 102 can recover the redundancy while keeping the characteristic of the RAID group 200 before the rebuilding processing.

If, as illustrated in FIG. 12, the CM 102 detects a new hot spare disk, the CM 102 sets one of the new hot spare disk and the optimization-target hot spare disk, which satisfies a predetermined condition, as a hot spare disk.

As a result, the CM 102 can typically perform the optimization to the state that a hot spare disk having the same or substantially the same characteristic as the characteristic of the magnetic disk devices included in a RAID group 200 is assigned to the RAID group 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A disk array control apparatus for controlling a disk array having a redundant configuration with two or more disk devices and a spare disk provided for lack of redundancy in the disk array, comprising:
an array control unit to detect the lack of redundancy in the disk array; and
a rebuilding control unit to perform rebuilding processing on a spare disk assigned to the disk array with the lack of redundancy detected by the array control unit, the spare disk being assigned to the disk array including the disk devices having a same characteristic as that of the spare disk, wherein,
the array control unit compares a characteristic of a new spare disk that has become newly available to the disk array with a characteristic of the spare disk assigned for rebuilding processing of the disk array lacking the redundancy and in use for the rebuilt disk array, and when the array control unit determines that the new spare disk has the characteristic that a storage capacity of the new spare disk is equal to or smaller than a storage capacity of the spare disk in use for the rebuilt disk array, is within a range of storage capacities usable for the disk array and the number of rotations of the new spare disk is equal to the number of rotations of the spare disk in use for the disk array lacking the redundancy, the array control unit assigns the new spare disk to the rebuilt disk array to replace the spare disk in use for the rebuilt disk array, copies data in the spare disk in use for the rebuilt disk array to the new spare disk and changes a state of the spare disk in use for the rebuilt disk array to an unused state.

2. A disk array system comprising:

a disk array having a redundant configuration including two or more disk devices;

a spare disk that is provided for the lack of redundancy of the disk array and is assigned to the disk array including disk devices having a same characteristic as that of the spare disk;

an array control unit to detect the lack of redundancy of the disk array; and a rebuilding control unit to perform rebuilding processing on the spare disk assigned to the disk array lacking the redundancy, wherein, the array control unit compares a characteristic of a new spare disk that has become newly available to the disk array with a characteristic of the spare disk assigned for rebuilding processing of the disk array lacking the redundancy and in use for the rebuilt disk array, and when the array control unit determines that the new spare disk has the characteristic that a storage capacity of the new spare disk is equal to or smaller than a storage capacity of the spare disk in use for the rebuilt disk array, is within a range of storage capacities usable for the disk array and the number of rotations of the new spare disk is equal to the number of rotations of the spare disk in use for the disk array lacking the redundancy, the array control unit assigns the new spare disk to the rebuilt disk array to replace the spare disk in use for the rebuilt disk array, copies data in the spare disk in use for the rebuilt disk array to the new spare disk and changes a state of the spare disk in use for the rebuilt disk array to an unused state.

3. A disk array control method comprising:

detecting lack of redundancy in a disk array having a redundant configuration with two or more disk devices;

performing rebuilding processing on a spare disk assigned to the disk array lacking the redundancy, the spare disk being assigned to the disk array including disk devices having a same characteristic as that of the spare disk;

comparing a characteristic of a new spare disk that has become newly available to the disk array with a characteristic of the spare disk assigned for rebuilding processing of the disk array lacking the redundancy and in use for the rebuilt disk array;

determining whether the new spare disk has the characteristic that a storage capacity of the new spare disk is equal to or smaller than a storage capacity of the spare disk in use for the rebuilt disk array, is within a range of storage capacities usable for the disk array and the number of rotations of the new spare disk is equal to the number of rotations of the spare disk in use for the rebuilt disk array; and assigning the new spare disk to the rebuilt disk array to replace the spare disk in use for the rebuilt disk array, copying data in the spare disk in use for the rebuilt disk array to the new spare disk and changing a state of the spare disk in use for the rebuilt disk array to an unused state, upon determining that the new spare disk has the characteristic that the storage capacity of the new spare disk is equal to or smaller than the storage capacity of the spare disk in use for the rebuilt disk array, is within the range of storage capacities usable for the disk array and the number of rotations of the new spare disk is equal to the number of rotations of the spare disk in use for the rebuilt disk array.

4. A disk array system comprising:

a disk array having a redundant configuration including two or more disk devices;

a spare disk that is provided for the lack of redundancy of the disk array and is assigned to the disk array including disk devices having a same characteristic as that of the spare disk;

an array control unit to detect the lack of redundancy of the disk array; and a rebuilding control unit to perform rebuilding processing on the spare disk assigned to the disk array lacking the redundancy, wherein the array control unit compares a characteristic of a new spare disk that has become newly available to the disk array with a characteristic of the spare disk in use for the rebuilt disk array, and when the array control unit determines that the new spare disk has the characteristic that a storage capacity of the new spare disk is equal to or smaller than a storage capacity of the spare disk in use for the rebuilt disk array and is within a range of storage capacities usable for the disk array, the array control unit assigns the new spare disk to the rebuilt disk array to replace the spare disk in use for the rebuilt disk array, copies data in the spare disk in use for the rebuilt disk array to the new spare disk and changes a state of the spare disk in use for the rebuilt disk array to an unused state.

* * * * *